United States Patent [19]
Bernstrom

[11] Patent Number: 6,070,441
[45] Date of Patent: Jun. 6, 2000

[54] TRAILER HITCH SECURITY DEVICE

[76] Inventor: John C. Bernstrom, 4919 Pierce Park La., Boise, Id. 83703

[21] Appl. No.: 09/228,543

[22] Filed: Jan. 4, 1999

[51] Int. Cl.[7] .................................................. E05B 69/00
[52] U.S. Cl. ................................ 70/58; 70/232; 70/258; 280/507
[58] Field of Search .................... 70/14, 18, 19, 70/58, 158, 163, 164, 166–169, 229–232, 258, 178; 280/507, 511

[56] References Cited

U.S. PATENT DOCUMENTS

| | | | |
|---|---|---|---|
| 3,526,110 | 9/1970 | Foote | 70/258 |
| 3,605,457 | 9/1971 | Foster | 70/14 |
| 3,770,300 | 11/1973 | Shepard | 280/511 |
| 3,796,074 | 3/1974 | Vik | 70/231 |
| 3,884,055 | 5/1975 | Vuillemot | 70/58 |
| 3,924,878 | 12/1975 | Utman et al. | 280/507 |
| 4,032,171 | 6/1977 | Allen et al. | 280/507 |
| 4,141,569 | 2/1979 | Dilk | 280/507 |
| 4,422,314 | 12/1983 | Cooper | 70/232 X |
| 4,459,832 | 7/1984 | Avrea et al. | 70/14 |
| 4,480,450 | 11/1984 | Brown | 70/14 |
| 4,552,377 | 11/1985 | Folkerts | 280/507 X |
| 4,571,964 | 2/1986 | Bratzler | 70/58 |
| 4,577,884 | 3/1986 | Harris | 280/507 |
| 4,648,618 | 3/1987 | Utman et al. | 280/507 |
| 4,730,841 | 3/1988 | Ponder | 70/258 X |
| 4,774,823 | 10/1988 | Callison | 70/14 |
| 4,776,607 | 10/1988 | Richter et al. | 280/507 |
| 4,925,205 | 5/1990 | Villalon et al. | 280/507 |
| 5,087,064 | 2/1992 | Guhlin | 280/507 |
| 5,147,096 | 9/1992 | Rogers | 280/507 |
| 5,351,511 | 10/1994 | Bernier | 70/232 |
| 5,421,601 | 6/1995 | Hinze et al. | 70/258 X |
| 5,433,468 | 7/1995 | Dixon | 280/507 |
| 5,441,295 | 8/1995 | Smith | 280/507 |
| 5,584,495 | 12/1996 | Mason | 280/507 |
| 5,675,997 | 10/1997 | Hulak | 70/258 X |
| 5,681,053 | 10/1997 | Misukanis et al. | 280/507 |
| 5,700,024 | 12/1997 | Upchurch | 280/507 |
| 5,794,961 | 8/1998 | Niswanger | 70/232 X |
| 5,868,014 | 2/1999 | Lee | 70/58 |
| 5,873,271 | 2/1999 | Smith | 70/58 |
| 5,908,201 | 6/1999 | Van Vleet | 280/511 X |

*Primary Examiner*—Suzanne Dino Barrett
*Attorney, Agent, or Firm*—Joseph W. Holland

[57] ABSTRACT

A trailer hitch security device includes a hitch receiver housing for placement over the receiver end of the trailer hitch with the receiver end of the trailer hitch extending through a hitch receiver slot formed in a first face of the hitch receiver housing. The hitch security device also includes housing closure member which is configured to enclose an open face of the hitch receiver housing in a locking engagement. In one embodiment of the relative dimensions and configurations of the hitch receiver slot and receiver end of the trailer hitch are such that withdrawal of the receiver end of the trailer hitch through the hitch receiver slot is impossible. Alternatively, the receiver end of the trailer hitch may be configured originally or by modification to include a whole or partial collar member or an ear attached for limiting withdrawal of the receiver end of the trailer hitch through the hitch receiver slot. In an alternate embodiment of the invention, removal or withdrawal of the receiver end of the trailer hitch is prohibited by a receiver engaging element engageable with the housing closure member.

19 Claims, 7 Drawing Sheets

TRAILER HITCH SECURITY DEVICE

BACKGROUND OF THE INVENTION

1. Technical Field

The present invention is related to security devices for trailers including a hitch having a receiver and, more specifically, to a trailer hitch security device including an enclosure configured to restrict removal of the hitch receiver when the enclosure is closed and locked.

2. Background

There is a recognized need for providing security for trailers which are used for transportation and storage of a variety of goods. Trailers for domestic and light industrial applications typically include a hitch having a receiver for receiving a ball which is employed by a towing vehicle for moving the trailer. So long as the hitch is secured to a vehicle, the trailer may be locked directly to the vehicle thereby providing a degree of security. However, trailers may be left unattended, sometimes for extended periods of time, and once the trailer hitch is removed from the vehicle and the trailer left unattended, it becomes a potential target for theft or removal by unauthorized personnel.

This problem has been recognized by a number of inventors who have taken a variety of approaches to providing locks and other security devices for trailer hitches. Some of these solutions include modifying the trailer hitch itself to include a locking mechanism. In other cases, the security device is configured as a boot, sleeve or strap which is configured to fit over the trailer hitch, the security device including a lock or means for locking of the device to the trailer hitch.

SUMMARY OF THE INVENTION

According to the present invention, a trailer hitch security device is includes a hitch receiver housing which is configured as an enclosure defining an internal cavity. The hitch receiver housing is further configured to permit placement over the receiver end of the trailer hitch typically by passing the receiver end of the trailer hitch through a hitch receiver entry aperture configured as an open face of the hitch receiver housing with the receiver end of the trailer hitch extending through a hitch receiver slot formed in a first face of the hitch receiver housing. The hitch receiver slot may be formed generally as an elongated cutaway formed generally as a rectangular slot on the first face of the housing. The hitch security device also includes a housing closure member which is configured to close the hitch receiver entry aperture of the hitch receiver housing in a locking engagement. The housing closure member may be configured having a base member which fits against or within the open face of the hitch receiver housing, thereby closing the hitch receiver entry aperture and a hitch receiver slot closure tab configured to fit against or within a portion of the hitch receiver slot thereby closing the hitch receiver slot and restricting removal of the receiver end of the trailer hitch from the hitch security device.

In one embodiment of the invention, removal or withdrawal of the receiver end of the trailer hitch is prohibited by the corresponding fit of the receiver end of the trailer hitch with the hitch receiver slot. Particularly, the relative configurations of the hitch receiver slot and receiver end of the trailer hitch are such that withdrawal of the receiver end of the trailer hitch through the hitch receiver slot is impossible. In this embodiment of the invention, the trailer hitch security device is configured for use on a trailer having a trailer hitch including an enlarged end member. An enlarged member is defined an end portion of the trailer hitch that is relatively larger in its perimeter or cross-sectional dimension than an adjoining and relatively narrow neck portion of the hitch. In the alternative, the receiver end of the trailer hitch may be configured originally or by modification to include a whole or partial collar member or an ear attached near the receiver end of the hitch which extends at an angle to the longitudinal axis of the trailer hitch for restricting withdrawal of the receiver end of the trailer hitch from the trailer hitch security device through the hitch receiver slot, once the device is secured over the receiver end of the hitch.

In one embodiment of the invention, the trailer hitch security device may include a hitch receiver slot configured to restrict passage of the trailer hitch enlarged end member from the hitch receiver housing when the hitch receiver slot closure tab is engaged with the hitch receiver slot. In addition, or in the alternative, the hitch receiver slot closure tab may be configured to restrict passage of the trailer hitch enlarged end member from the hitch receiver housing when the hitch receiver slot closure tab is engaged with the hitch receiver slot.

In an alternate embodiment of the invention, removal or withdrawal of the receiver end of the trailer hitch is prohibited by a receiver engaging element engageable with the housing closure member. In one embodiment of the invention, the receiver engaging element is configured as a trailer hitch ball which is attached to the housing closure base. In the alternative, the receiver engaging element may be configured as a trailer hitch ball having a stem extending below the ball, the stem being extendable through an aperture formed in the housing closure base. Again, once the device is secured over the receiver end of the hitch, restricting withdrawal of the receiver end of the trailer hitch from the trailer hitch security device through the hitch receiver slot.

The housing closure member is secured to the hitch receiver housing by the interlocking engagement of a first cooperating lock element and a second cooperating lock element. The first cooperating lock element is attached to the hitch receiver housing, and the second cooperating lock element is engageable with the first cooperating lock element for restricting disengagement of the hitch receiver housing and the housing closure member.

In one embodiment of the invention, the first cooperating lock element may be configured including an aperture formed in the housing closure base and a corresponding pin attached to the hitch receiver housing. The pin is located and configured so as to pass through the housing closure member aperture upon engaging the housing closure member with the hitch receiver housing. The pin is configured to engage with the second cooperating lock element in a locking manner for restricting disengagement of the hitch receiver housing and the housing closure member.

The second cooperating lock element may be configured as a locking member including a body having an aperture configured for engagement with the pin. The locking member also includes a pin engagement element for securing the pin within the locking member.

The housing closure member may be further defined to include a locking member compartment configured to restrict access to the locking member when the locking member is engaged with the pin.

In use, once the receiver end of the hitch is placed through the hitch receiver slot, the housing closure member is engaged with the hitch receiver housing with the receiver engaging element engaging the receiver of the hitch. Once the trailer hitch security device is secured to the receiver end of the hitch, the receiver end of the hitch may not be withdrawn from the device. In the case where the receiver end of the hitch is configured having an enlarged member, withdrawal of the receiver end of the hitch from the trailer hitch security device is restricted both by the hitch receiver slot which is sized and configured such that withdrawal of the enlarged end member of the hitch is prohibited through the hitch receiver slot, by the hitch receiver slot closure tab which may be configured to restrict passage of the trailer hitch enlarged end member from the hitch receiver housing. In the embodiment of the invention that employs a receiver engaging element withdrawal of the receiver end of the trailer hitch through the hitch receiver slot is achieved by the attaching the receiver of the trailer hitch to the receiver engaging element.

Additional objects, advantages and novel features of the invention will be set forth in part in the description that follows, and in part will become apparent to those skilled in the art upon examination of the following, or may be learned by practice of the invention. The objects and advantages of the invention may be realized and attained by means of the instrumentalities and combinations particularly pointed out in the appended claims.

DETAILED DESCRIPTION OF THE INVENTION

Figure 1:
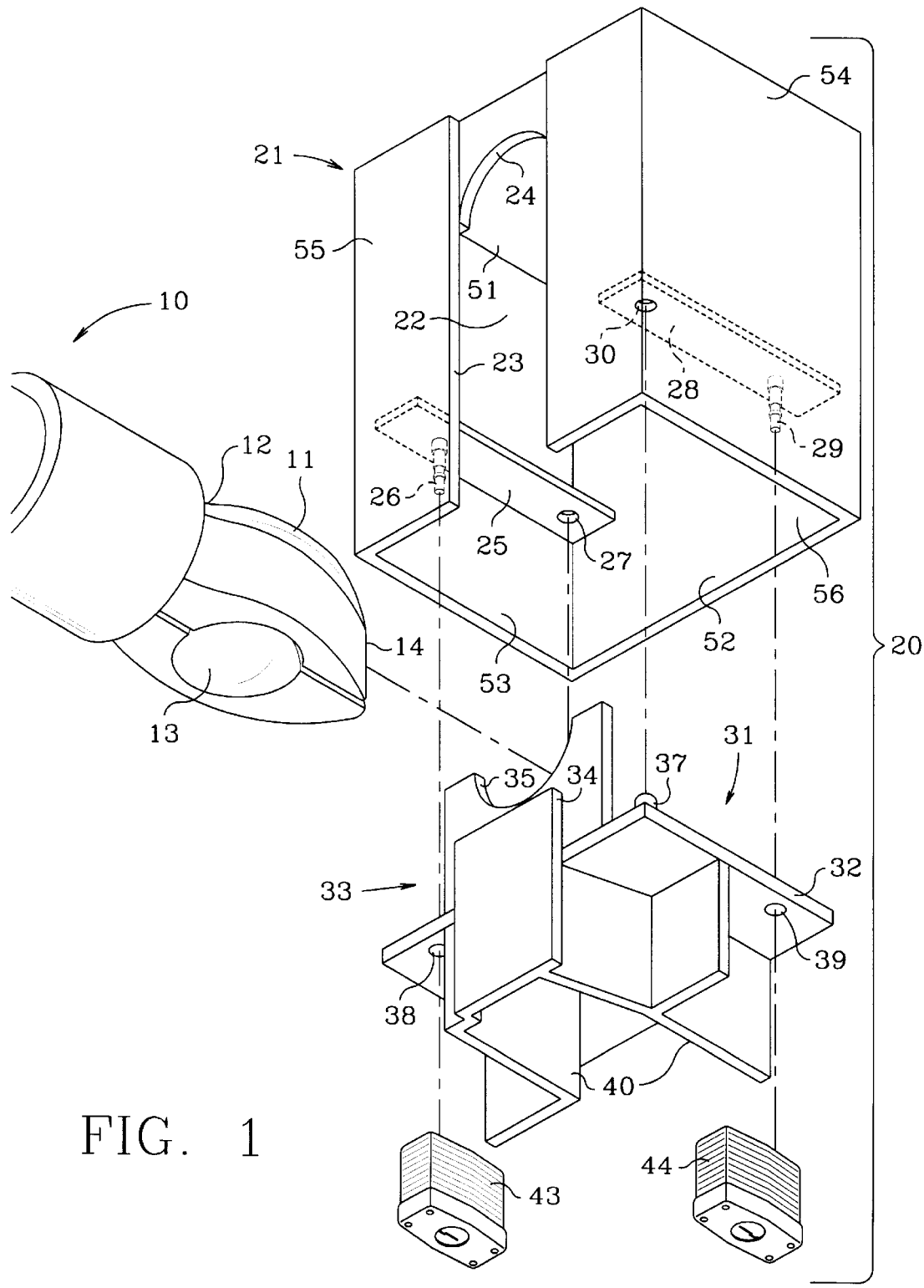
FIG. 1 is an exploded perspective representational view of one embodiment of a trailer hitch security device according to the present invention.

Referring now to the Figures, the trailer hitch security device will be more fully described. Referring to FIG. 1, trailer hitch 10 includes receiver end 14 and is shown having an enlarged end member 11 and a relatively narrow neck section 12. Trailer hitch 10 is shown in position for placement within trailer hitch security device 20. Trailer hitch 10 also includes a receiver 13 for receiving a trailer hitch ball (not shown).

FIG. 1 also shows trailer hitch security device 20 including generally hitch receiver housing 21 and housing closure member 31. Hitch receiver housing 21 includes top panel 51, back panel 52, first side panel 53, second side panel 54 and face panel 55. It should be recognized by those skilled in the art that while hitch receiver housing 21 is shown here as having a substantially rectangular configuration, it may be formed in a variety of configurations so long as an enclosure cavity 22 is provided that is adequate in size to accept receiver end 14 of trailer hitch 10.

Hitch receiver housing 21 also includes hitch receiver entry aperture 56 and hitch receiver slot 23 which is formed in face panel 55 and is configured to allow passage of receiver end 14 of trailer hitch 10 into enclosure cavity 22.

Figure 5:
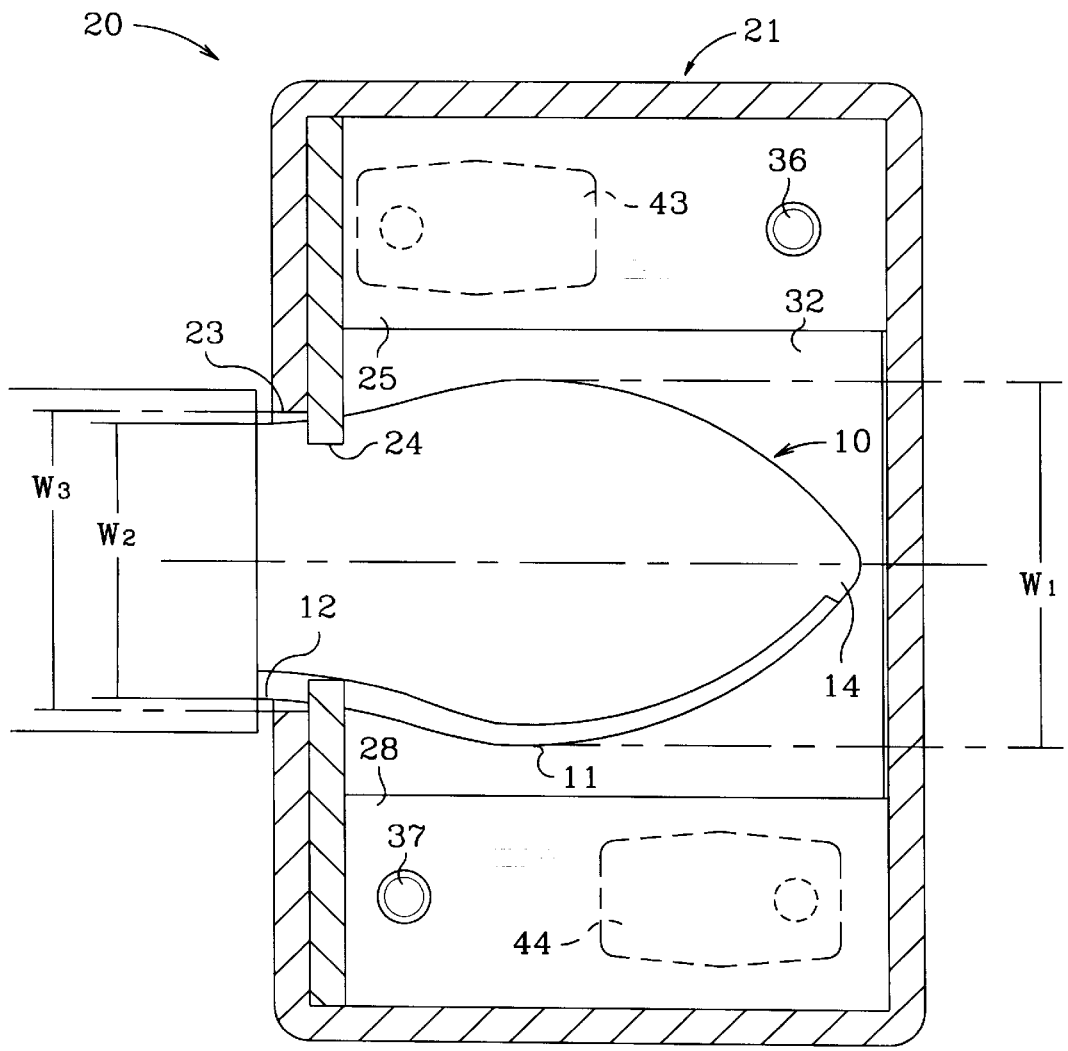
FIG. 5 is a bottom cutaway representational view of one embodiment of a trailer hitch security device according to the present invention.

Referring to FIG. 5, it will be noted that hitch receiver slot 23 is defined having a width $W_3$ which is slightly greater than width $W_2$ of relatively narrow neck portion 12 and slightly less than width $W_1$ of enlarged end member 11. This configuration prohibits withdrawal of receiver end 14 of trailer hitch 10 through hitch receiver slot 23. FIG. 5 also shows trailer hitch 10 having receiver end 14 engaged with hitch receiver housing 21. Specifically, slot 23 is shown placed over relatively narrow neck portion 12.

Referring again to FIG. 1, it will also be noted that hitch receiver slot 23 is configured in this embodiment of the invention to include first neck saddle 24 which is shaped to provide a generally contoured fit and therefore a more restrictive fit against relatively narrow neck portion 12.

Hitch receiver housing 21 also includes first land 25 which is attached to the inside surface of first side panel 53 and second land 28 which is attached to the inside surface of second side panel 54. First land 25 includes a first pin 26 and first location aperture 27. Second land 28 similarly includes a second pin 29 and second location aperture 30.

Housing closure member 31 includes housing closure base member 32 and hitch receiver slot closure tab 33. Hitch receiver entry closure tab 33 is configured including tongue 34 which, in this embodiment of the invention, is sized to provide a sliding fit within hitch receiver slot 23. Hitch receiver slot closure tab 33 also includes second neck saddle 35 which is configured to provide a generally contoured fit to the underside of relatively narrow neck portion 12 of trailer hitch 10.

Housing closure member 31 also include second location dowel 37 which is attached to the upper face of housing closure base 32 and is positioned and configured for sliding engagement with second location aperture 30. Housing closure base 32 is also configured to include first pin aperture 38 and second pin aperture 39 which are sized and located for sliding engagement with first pin 26 and second pin 29 respectively. First lock 43 is configured for locking engagement with first pin 26 and, similarly, second lock 44 is configured for locking engagement with second pin 29.

Housing closure base 32 also includes a plurality of reinforcement fins 40 which are configured to provide rigidity to the structure of housing closure base 32 as well as protection for device components, particularly first lock 43 and second lock 44.

Figure 2:
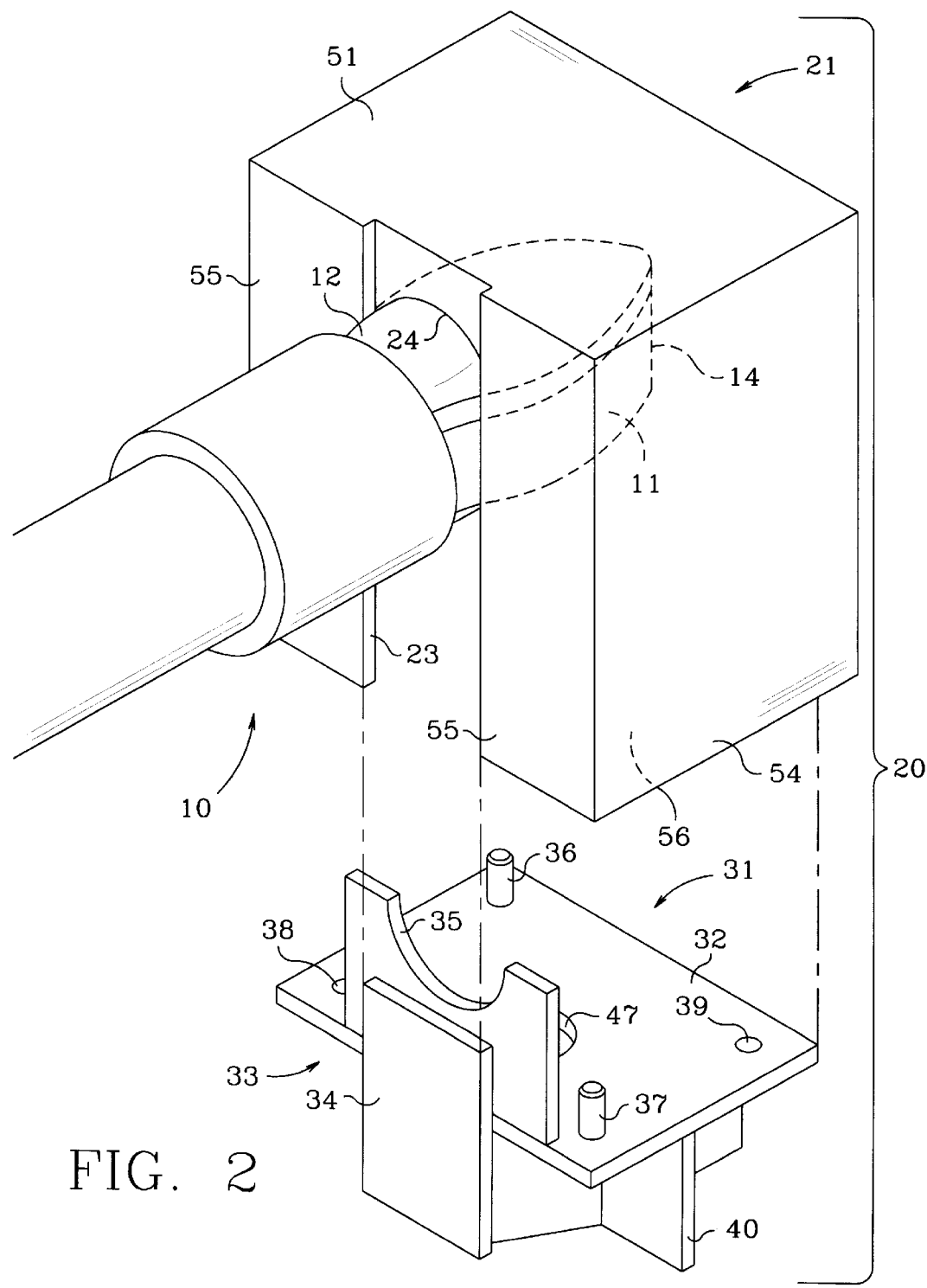
FIG. 2 is an exploded perspective representational view of one embodiment of a trailer hitch security device according to the present invention.

Referring to FIG. 2, trailer hitch 10 is shown including receiver end 14 having enlarged end member 11 placed within enclosure cavity 22 of hitch receiver housing 21 of trailer hitch security device 20. Specifically, slot 23 is shown placed over relatively narrow neck portion 12 with first neck saddle 24 resting against the upper portion of relatively narrow neck portion 12.

FIG. 2 also shows housing closure member 31 including housing closure base 32 and hitch receiver slot closure tab 33. Once again, hitch receiver slot closure 33 is shown including tongue 34 and second neck saddle 35. Also shown in FIG. 2 is first location dowel 36 which cooperates with first location aperture 27 (not shown in FIG. 2) to provide alignment of housing closure member 31 within hitch receiver housing 21. FIG. 2 also shows ball stem aperture 47 which is sized to accept the stem of a trailer hitch ball (not shown in FIG. 2).

Figure 3:
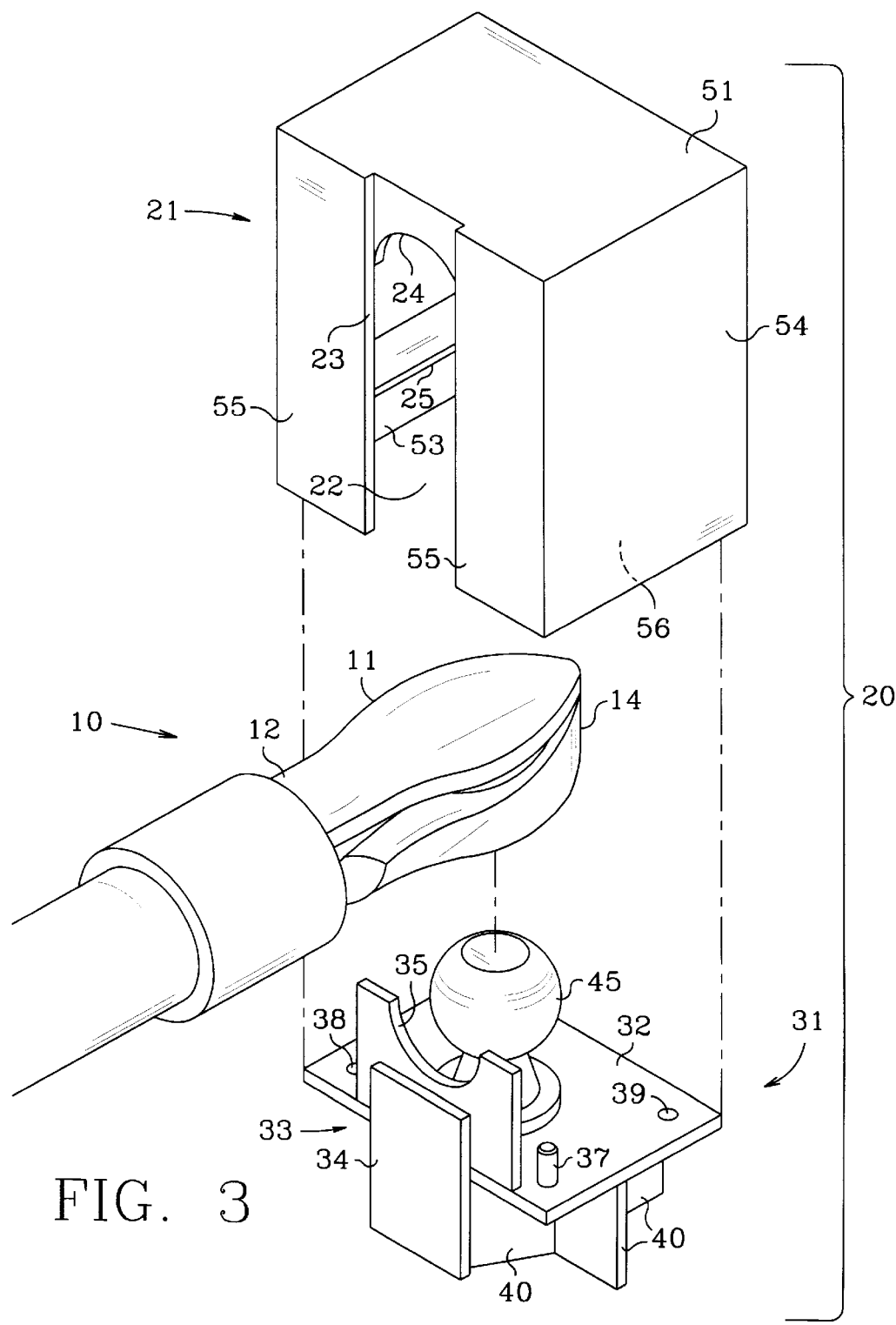
FIG. 3 is an exploded perspective representational view of one embodiment of a trailer hitch security device according to the present invention.

Referring to FIG. 3, an alternate embodiment of trailer hitch security device 20 is shown including trailer hitch ball 45 which is shown placed on the upper surface of housing closure base 32. Housing closure member 31 is also shown including hitch receiver slot closure tab 33 including tongue 34 and second neck saddle 35, second location dowel 37, first pin aperture 38 and second pin aperture 39. Reinforcement fins 40 are shown attached to the underside of housing closure base 32. FIG. 3 also shows hitch receiver housing 21 including receiver entry slot 23 formed in face panel 55, hitch receiver slot 23 including first neck saddle 24.

As shown in FIG. 3, trailer hitch 10 is positioned for placement within trailer hitch security device 20. Receiver 13 (not shown in FIG. 3) will engage trailer hitch ball 45 shown attached to housing closure base 32. Next, hitch receiver housing 21 will be placed over trailer hitch 10 by sliding receiver entry slot 23 over relatively narrow neck portion 12 with enlarged end member 11 of receiver end 14 placed within enclosure cavity 22 until first neck saddle 24 rests against the upper portion of relatively narrow neck portion 12. At this point, housing closure member 31 is engaged within hitch receiver entry aperture 56 of hitch receiver housing 21 with the lower side of relatively narrow neck portion 12 resting against second neck saddle 35. In this position, the upper portion of housing closure base 32 abuts first land 25 and second land 28 (not shown in FIG. 3).

Figure 4:
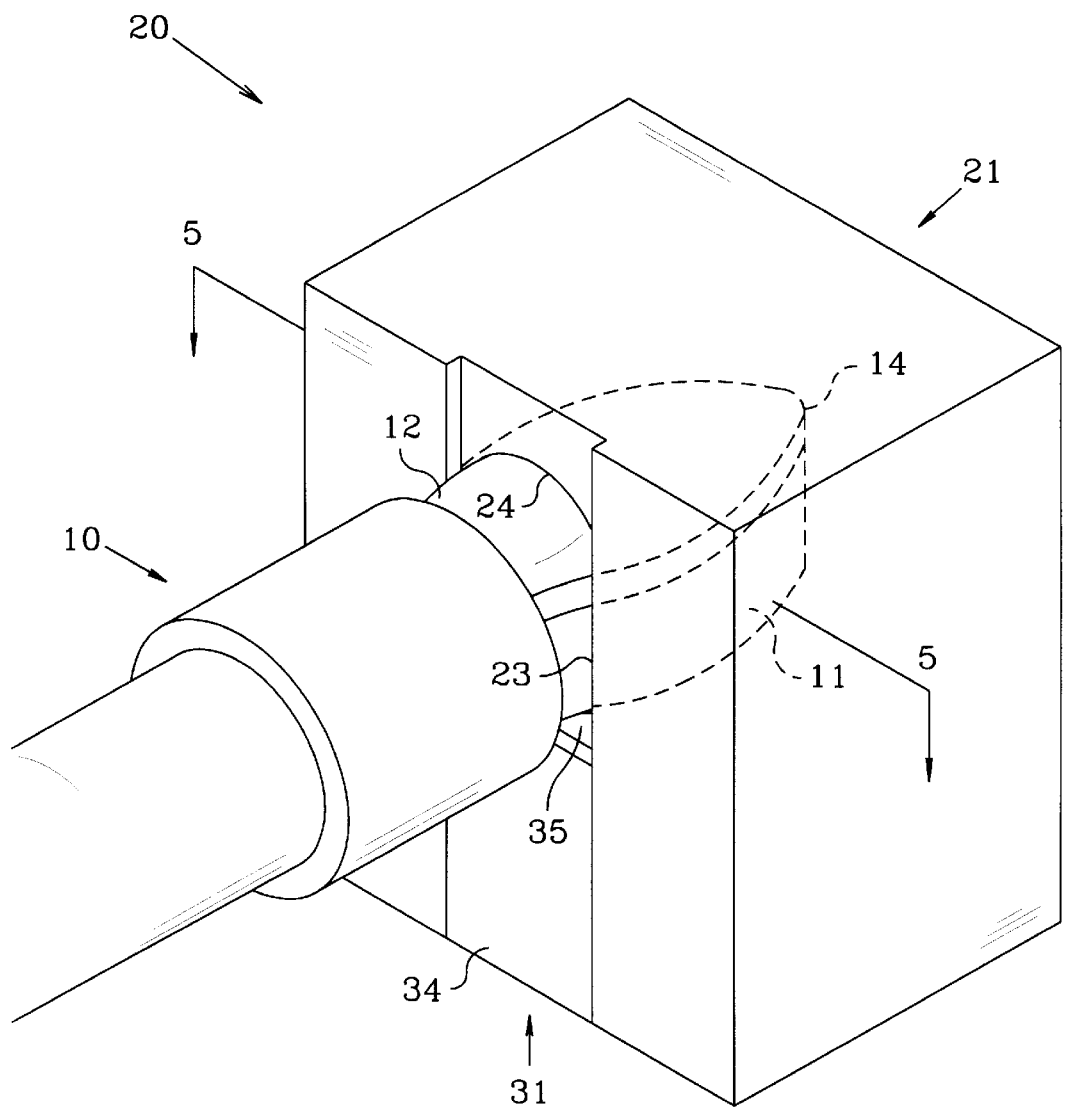
FIG. 4 is a perspective representational view of one embodiment of a trailer hitch security device according to the present invention.

Referring to FIG. 4, trailer hitch 10 is shown with receiver end 14 having enlarged end member 11 secured within trailer hitch security device 20. Particularly, slot 23 is shown abutting relatively narrow neck portion 12 with first neck saddle 24 resting against the top portion of relatively narrow portion 12 and second neck saddle 35 resting against the lower portion of relatively narrow neck portion 12. FIG. 4 also shows housing closure member 31 including tongue 34 slidingly engaged within hitch receiver slot 23.

Referring to FIG. 5, trailer hitch 10 is shown with receiver end 14 having enlarged end member 11 secured within trailer hitch security device 20. Particularly, slot 23 is shown abutting relatively narrow neck portion 12. FIG. 5 also shows housing closure base 32 slidingly engaged within hitch receiver housing 21. Also shown in FIG. 5 is first location dowel 36 attached to the upper face of housing closure base 32. Similarly, second location dowel 37 is shown attached to the upper face of housing closure base 32. Finally, FIG. 5 shows the relative locations of first lock 43 and second lock 44.

Figure 6:
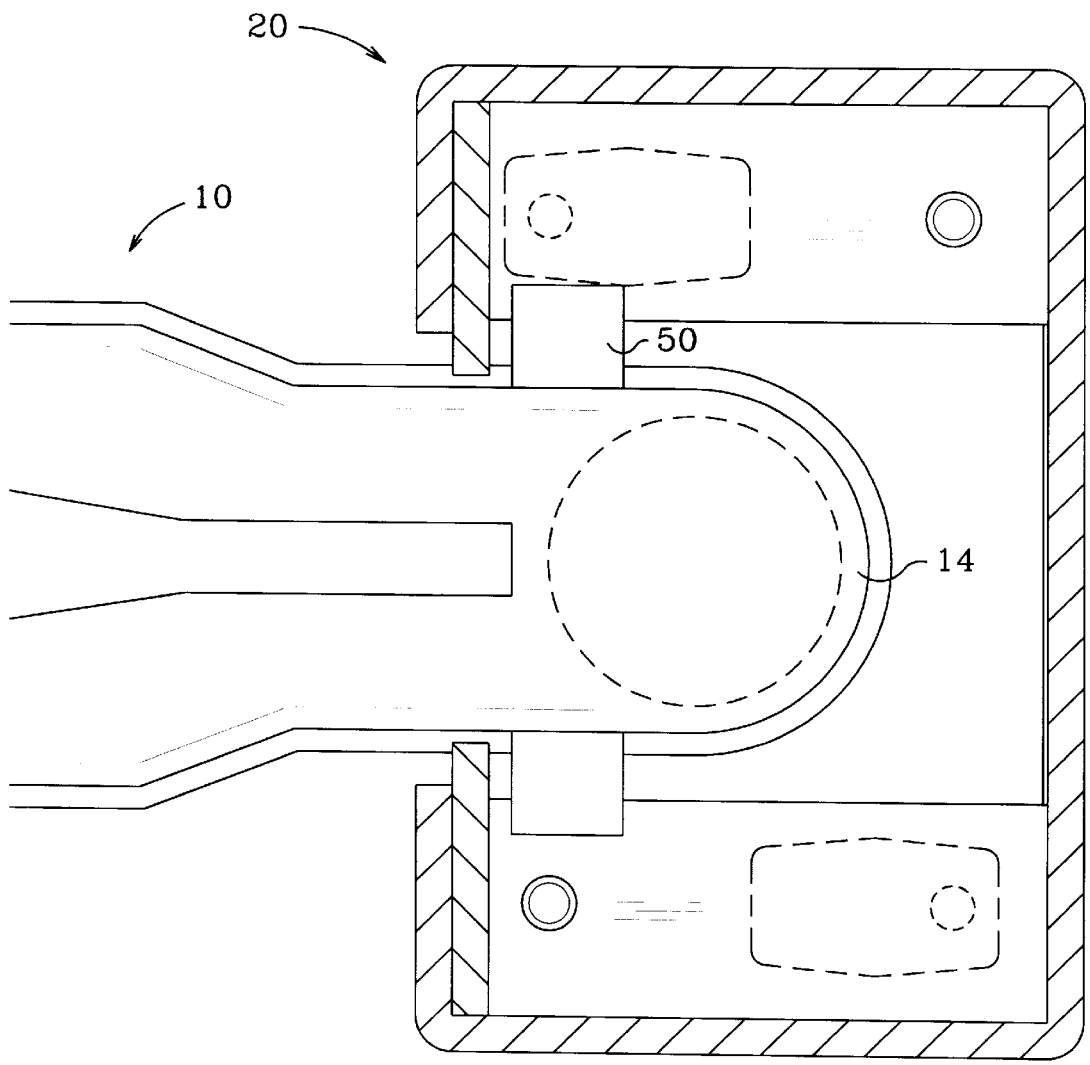
FIG. 6 is a bottom cutaway representational view of an alternate embodiment of a trailer hitch security device according to the present invention.

FIG. 6 shows an alternate embodiment of the trailer hitch security device 20 which is configured for placement over trailer hitch 10 which does not have a relatively narrow neck portion. In this case, ears 50 are attached near receiver end 14 of trailer hitch 10 in such a manner as to restrict passage of trailer hitch security device 20 from the receiver end of trailer hitch 10 when trailer hitch security device 20 is secured.

Figure 7:
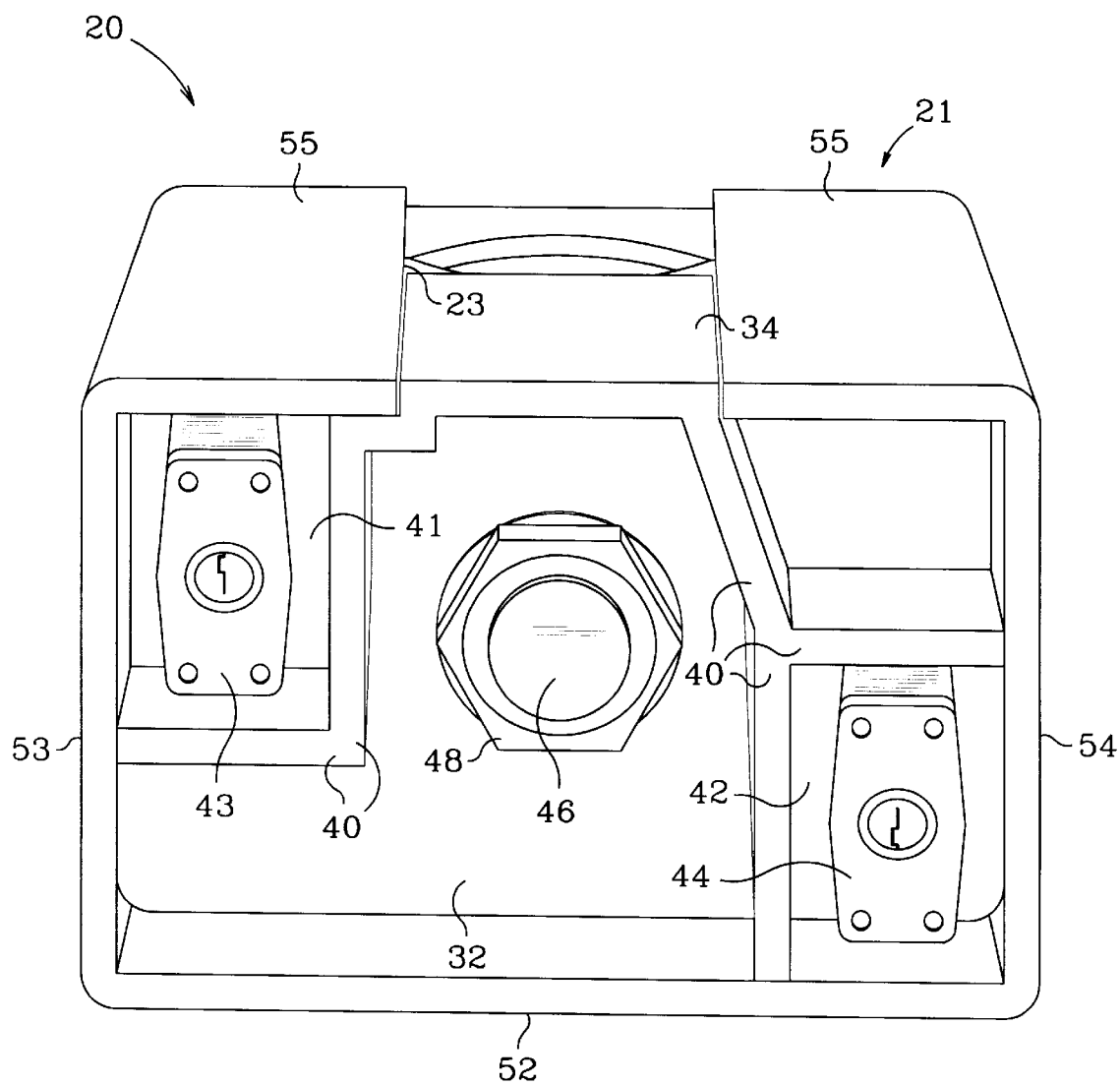
FIG. 7 is a perspective representational view of an embodiment of a trailer hitch security device according to the present invention.

FIG. 7 shows trailer hitch security device 20 including housing closure member 31 inserted within the bottom opening of hitch receiver housing 21. Reinforcement fins 40 are shown attached to housing closure base 32 in such a manner as to form a first lock compartment 41 and second lock compartment 42 for providing limited access to and security for first lock 43 and second lock 44. FIG. 7 shows ball stem 46 extending through housing closure base 32 and secured using nut 48. Finally, FIG. 7 shows tongue 34 slidingly engaged within hitch receiver slot 23.

I claim:

1. A trailer hitch security device for a trailer hitch including an enlarged end member comprising:

a hitch receiver housing configured as an enclosure, the hitch receiver housing including a first face having a hitch receiver slot and a second face having a hitch receiver entry aperture;

a housing closure member including a housing closure base and a hitch receiver slot closure tab attached to and extending from the housing closure base, the hitch receiver slot closure tab engageable with the hitch receiver slot, the housing closure member engageable with the hitch receiver housing restricting access to a receiver end of a trailer hitch through the hitch receiver entry aperture;

a first cooperating lock element attached to the hitch receiver housing; and a second cooperating lock element engageable with the first cooperating lock element for restricting disengagement of the hitch receiver housing and the housing closure member.

2. The trailer hitch security device of claim 1 wherein the hitch receiver slot is configured to restrict passage of the trailer hitch enlarged end member from the hitch receiver housing when the hitch receiver slot closure tab is engaged with the hitch receiver slot.

3. The trailer hitch security device of claim 1 wherein the hitch receiver slot closure tab is configured to restrict passage of the trailer hitch enlarged end member from the hitch receiver housing when the hitch receiver slot closure tab is engaged with the hitch receiver slot.

4. The trailer hitch security device of claim 1 wherein the first cooperating lock element further comprises:

the housing closure member including an aperture; and a pin attached to the hitch receiver housing, the pin located and configured to pass through the housing closure member aperture upon engaging the housing closure member with the hitch receiver housing, the pin configured for engagement with the second cooperating lock element for restricting disengagement of the hitch receiver housing and the housing closure member.

5. The trailer hitch security device of claim 4 wherein the second cooperating lock element further comprises:

a locking member including a body having an aperture configured for engagement with the pin; and a pin engagement element for securing the pin within the locking member.

6. The trailer hitch security device of claim 5 wherein the housing closure member further comprises a locking member compartment configured to restrict access to the locking member when the locking member is engaged with the pin.

7. The trailer hitch security device of claim 1 further comprising a receiver engaging element engageable with the housing closure member.

8. The trailer hitch security device of claim 1 further comprising a receiver engaging element connected to the housing closure member.

9. The trailer hitch security device of claim 7 wherein the receiver engaging element further comprises a trailer hitch ball engageable with the housing closure member.

10. The trailer hitch security device of claim 8 wherein the receiver engaging element further comprises a trailer hitch ball connected to the housing closure member.

11. A trailer hitch security device for a trailer hitching device including an enlarged end member, the trailer hitch security device comprising:

a hitch receiver housing configured as an enclosure, the hitch receiver housing including a hitch receiver slot;

a housing closure member including a housing closure base and a hitch receiver slot closure tab attached to and extending from the housing closure base, the hitch receiver slot closure tab engageable with the hitch receiver slot, the housing closure member engageable with the hitch receiver housing;

a receiver engaging element engageable with the housing closure member, a first cooperating lock element attached to the hitch receiver housing; and a second cooperating lock element engageable with the first cooperating lock element for restricting disengagement of the hitch receiver housing and the housing closure member.

12. The trailer hitch security device of claim 11 wherein the hitch receiver slot is configured to restrict passage of the trailer hitch enlarged end member from the hitch receiver housing when the hitch receiver slot closure tab is engaged with the hitch receiver slot.

13. The trailer hitch security device of claim 11 wherein the hitch receiver slot closure tab is configured to restrict passage of the trailer hitch enlarged end member from the hitch receiver housing when the hitch receiver slot closure tab is engaged with the hitch receiver slot.

14. The trailer hitch security device of claim 11 wherein the first cooperating lock element further comprises:

the housing closure member including an aperture formed in the housing closure base; and a pin attached to the hitch receiver housing, the pin located and configured to pass through the housing closure member aperture upon engaging the housing closure member with the hitch receiver housing, the pin configured for engagement with the second cooperating lock element for restricting disengagement of the hitch receiver housing and the housing closure member.

15. The trailer hitch security device of claim 11 wherein the second cooperating lock element further comprises:

a locking member including a body having an aperture configured for engagement with the pin; and a pin engagement element for securing the pin within the locking member.

16. The trailer hitch security device of claim 17 wherein the housing closure member further comprises a locking member compartment configured to restrict access to the locking member when the locking member is engaged with the pin.

17. The trailer hitch security device of claim 11 wherein the receiver engaging element is connected to the housing closure member.

18. The trailer hitch security device of claim 11 wherein the receiver engaging element further comprises a trailer hitch ball engageable with the housing closure member.

19. The trailer hitch security device of claim 17 wherein the receiver engaging element further comprises a trailer hitch ball connected to the housing closure member.

* * * * *